United States Patent [19]

Sowles et al.

[11] Patent Number: 5,561,836
[45] Date of Patent: Oct. 1, 1996

[54] METHOD AND APPARATUS FOR QUALIFYING ACCESS TO COMMUNICATION SYSTEM SERVICES BASED ON SUBSCRIBER UNIT LOCATION

[75] Inventors: Kenneth L. Sowles, Chandler; David Terris, Phoenix; James P. Redden, Mesa, all of Ariz.

[73] Assignee: Motorola, Inc., Schaumburg, Ill.

[21] Appl. No.: 236,801

[22] Filed: May 2, 1994

[51] Int. Cl.$^6$ .................................................. H04B 7/185
[52] U.S. Cl. .................... 455/12.1; 455/33.1; 342/357
[58] Field of Search ................................. 455/12.1, 13.1, 455/13.2, 54.1, 54.2, 56.1, 33.1, 33.2; 379/59; 342/450, 457, 357

[56] References Cited

U.S. PATENT DOCUMENTS

| | | | |
|---|---|---|---|
| 4,233,473 | 11/1980 | Frost | 179/2 EB |
| 4,993,067 | 2/1991 | Leopold | 380/21 |
| 5,235,633 | 8/1993 | Pennison et al. | 455/33.2 |
| 5,303,286 | 4/1994 | Wiedeman | 455/12.1 |
| 5,343,512 | 8/1994 | Wang et al. | 455/12.1 |
| 5,373,298 | 12/1994 | Karouby | 455/12.1 |

OTHER PUBLICATIONS

"Method Of Adapting A GSM Switch To A Moving Cell Environment" by Ken Sowles, Jan. 24, 1994.

Primary Examiner—Edward F. Urban
Attorney, Agent, or Firm—Phillip E. Hall; Sherry J. Whitney

[57] ABSTRACT

A communication system qualifies access to the services it provides to subscriber units based upon the locations of the subscriber units. Subscriber unit location data are routed through a satellite to a gateway where a home subscriber information manager for the subscriber unit resides. This home gateway selects a service control area and corresponding serving gateway to use in establishing calls to and from the subscriber unit. When an area of uncertainty for the subscriber unit's location overlies a boundary between service control areas, additional location data may be obtained to shrink the area of uncertainty. If the area still overlies a boundary, a serving gateway is selected based upon the current serving gateway, the home gateway, and the service control area where the center of the area of uncertainty resides.

24 Claims, 8 Drawing Sheets

| EPHEMERIS TABLE | | | | 118 |
|---|---|---|---|---|
| TIME | SATELLITE IDENTITY | CELL IDENTITY | BEAM LOCATION | |
| — | — | — | — | |
| — | — | — | — | |
| ⋮ | ⋮ | ⋮ | ⋮ | |
| — | — | — | — | |

FIG. 7

| PERMANENT SUBSCRIBER UNIT DATABASE | | | | | | | 128 |
|---|---|---|---|---|---|---|---|
| SUBSCRIBER IDENTITY | FEATURES | STATUS | LAST LOCATION | SERVING GATEWAY | TIME STAMP | OTHER | |
| — | — | — | — | — | — | — | |
| — | — | — | — | — | — | — | |
| ⋮ | ⋮ | ⋮ | ⋮ | ⋮ | ⋮ | ⋮ | |
| — | — | — | — | — | — | — | |

| SERVICE CONTROL AREA DATABASE | | | | 132 |
|---|---|---|---|---|
| AREA DATA | GATEWAY IDENTITY | ALLOWANCE AND BOUNDARY RULES | OTHER | |
| — | — | — | — | |
| — | — | — | — | |
| ⋮ | ⋮ | ⋮ | ⋮ | |
| — | — | — | — | |

5,561,836

METHOD AND APPARATUS FOR QUALIFYING ACCESS TO COMMUNICATION SYSTEM SERVICES BASED ON SUBSCRIBER UNIT LOCATION

TECHNICAL FIELD OF THE INVENTION

The present invention relates generally to radio communication systems and more specifically, to radio communication systems in which communication services are provided to subscriber units in response to the locations of the subscriber units.

BACKGROUND OF THE INVENTION

In a radio communication system in which communication services are provided to numerous subscriber units dispersed throughout a large area, system knowledge about the subscriber units' locations is desirable. This location knowledge allows the system to route incoming calls for the subscriber units to only the areas where the subscriber units currently reside. In addition, this location knowledge allows the system to operate across the boundaries of diverse geopolitical entities.

A geopolitical entity which governs a region where communication services are provided typically exerts an influence over the provision of those services. The electromagnetic spectrum used to deliver communication services is typically allocated and licensed by the geopolitical entity. In addition, the geopolitical entity may impose various tariffs on the communication services delivered within the entity's jurisdiction. Nothing requires diverse geopolitical entities to adopt identical approaches to influencing communication services. Consequently, a communication system which spans diverse geopolitical jurisdictions needs to be sufficiently flexible to allow diverse geopolitical entities to exert the influences they wish to exert.

SUMMARY OF THE INVENTION

Accordingly, it is an advantage of the present invention to provide an improved radio communication system.

Another advantage is that the present invention qualifies communication services in response to the locations of subscriber units.

Another advantage is that the present invention allows access or denies communication services based upon a subscriber unit's location.

Another advantage is that the present invention selects a switching office that is associated with a particular geographical area to handle communication services for a subscriber unit based upon the subscriber unit's location.

The above and other advantages of the present invention are carried out in one form by a method of operating a communication system having at least one satellite moving in an orbit around the earth and having at least one subscriber unit located proximate the earth's surface. The method calls for generating location data that identify a location of the subscriber unit relative to the earth. Area data that identify geographical areas of the earth are stored. The location data are correlated with the area data. Communication services provided for the subscriber unit are qualified in response to the correlation between location and area data.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 7 shows a block diagram of an ephemeris table maintained in a memory portion of a node of the communication system that serves as a home gateway;

FIG. 8 shows a block diagram of a subscriber unit database maintained in the memory portion of the home gateway;

FIG. 9 shows a block diagram of a service control area database maintained in the memory portion of the home gateway;

DETAILED DESCRIPTION OF THE PREFERRED EMBODIMENTS

Figure 1:
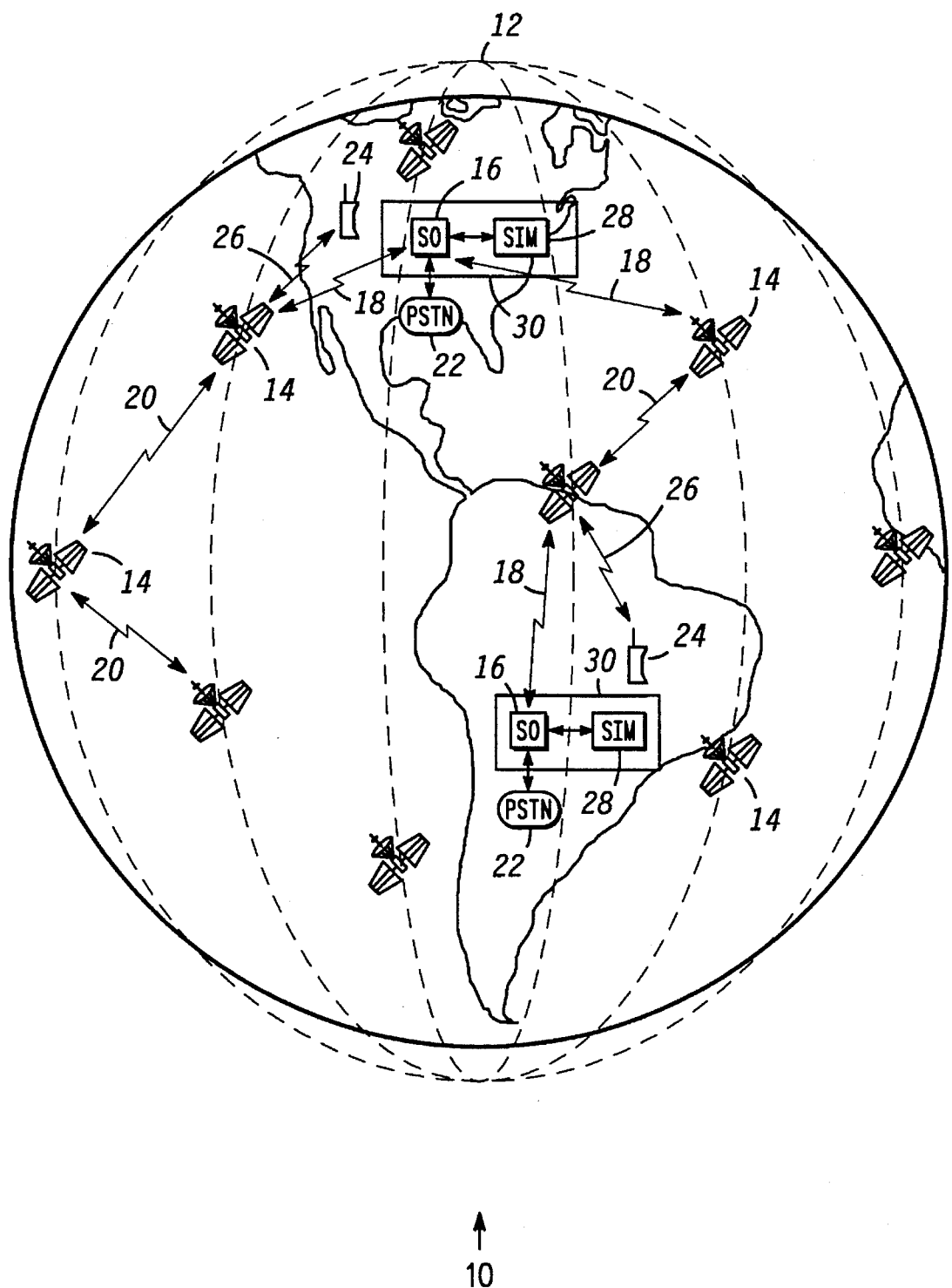
FIG. 1 shows a diagram of the environment within which a communication system configured in accordance with the teaching of the present invention may be practiced.

FIG. 1 shows a layout diagram of an environment within which a radio communication system 10 operates. System 10 includes a constellation 12 of satellites 14 placed in orbits around the earth. In the preferred embodiment, the configuration of constellation 12 allows at least one of satellites 14 to be within view of each point on the surface of the earth at all times.

Due to their earth orbits, satellites 14 constantly move relative to the earth. In the preferred 15 embodiments, satellites 14 move in orbits at an altitude in the range of 500–1000 Km above the earth. If, for example, satellites 14 are placed in orbits which are around 765 km above the earth, then an overhead satellite 14 travels at a speed of around 25,000 km/hr with respect to a point on the surface of the earth. Electromagnetic signals traveling at or near the speed of light between the surface of the earth and a satellite communication node 14 in such an orbit will require a propagation duration of 2–3 msec or more, depending on the satellite's angle of view. Moreover, electromagnetic signals traveling between the surface of the earth and a satellite 14 in such an orbit may experience a considerable Doppler component of frequency shift, the precise value of which is dependent on a source frequency and the satellite's angle of view. While the invention is described in terms of a specific example of an orbiting satellite communication system, the invention will also work with geostationary satellite communication systems.

System 10 additionally includes one or more switching offices (SOs) 16. SOs 16 reside on the surface of the earth and are in data communication with nearby ones of satellites 14 through RF communication links 18. Satellites 14 are also in data communication with one another through data communication links 20. Hence, through constellation 12 of satellites 14, an SO 16 may control communications delivered to any size region of the earth. However, the region controlled by each SO 16 is preferably associated with one or more specific geopolitical jurisdictions, such as one or more countries. These jurisdictions are referred to as service control areas herein. SOs 16 couple to public switched telecommunication networks (PSTNs) 22, from which calls directed toward subscribers of system 10 may be received and to which calls placed by subscribers of system 10 may be sent.

System 10 also includes a population with potentially millions of members of subscriber units 24. However, the present invention applies even if the population includes only a few subscriber units 24. Subscriber units 24 are configured to engage in communications with satellites 14 over portions of the electromagnetic spectrum that are allocated by governmental agencies associated with various service control areas. Subscriber units 24 communicate with nearby satellites 14 through communication links 26. System 10 accommodates the movement of subscriber units 24 anywhere on or near the surface of the earth. However, nothing requires subscriber units 24 to be mobile.

Any number of data processors, referred to herein as subscriber information managers (SIMs) 28, may also be included within system 10. Each SIM 28 maintains a subscriber database that is relevant to only its own portion of the population of subscriber units 24. The database may include information describing features associated with subscriber units 24, rates to be associated with subscriber units 24, current locations for subscriber units 24, and the like. Each subscriber unit 24 is assigned to one of SIMs 28, and that one SIM 28 is considered the "home" SIM 28 for the subscriber unit 24. SIMs 28 perform data processing for system 10. In addition to data processing, SOs 16 perform circuit 10 switching, and they control call setup, call recordkeeping, call knockdown and other management functions which take place in telecommunication systems on a call-to-call basis. While the functions of SIMs 28 and SOs 16 are not required to take place at common physical locations, in a preferred embodiment of the present invention they both take place at gateways 30. Each SO 16 may communicate with any SIM 28, or vice versa, through constellation 12, PSTN 22, another communication path, or shared hardware when such communication takes place within a common gateway 30.

In general, system 10 is a communication network having many nodes. Each subscriber unit 24, satellite 14, gateway 30, SO 16, and/or SIM 28 represents a node of system 10. All nodes of system 10 are or may be in data communication with other nodes of system 10 through communication links 18, 20, and/or 26. In addition, all nodes of system 10 are or may be in data communication with other telephonic devices dispersed throughout the world through PSTNs 22.

System 10 desirably provides a variety of services for subscriber units 24. For example, such services may include the establishment of connections, circuits, data communication channels, and the like, necessary for routing an incoming call to a subscriber unit 24 or an outgoing call from a subscriber unit 24. In addition, such services may include a registration process through which a subscriber unit informs system 10, and particularly the subscriber unit's home SIM 28, of its location so that future incoming calls may be correctly directed to the area where the subscriber unit 24 is likely to be.

Communication services, including calls, may be set up between two subscriber units 24 or between any subscriber unit 24 and a PSTN phone number. Calls may be set up between any two locations on the earth, assuming appropriate licenses have been obtained in jurisdictions where the locations reside and any other qualifications imposed by such jurisdictions are met. Generally speaking, each subscriber unit 24 engages in system communications with satellites 14 and gateways 30 during call setup and during registration. The call setup communications take place prior to forming a communication path between a subscriber unit 24 and another unit, which may be another subscriber unit 24 or a PSTN phone number. The communications which take place to establish a call involve the one or more SOs 16 in whose area the call is being terminated.

Figure 2:
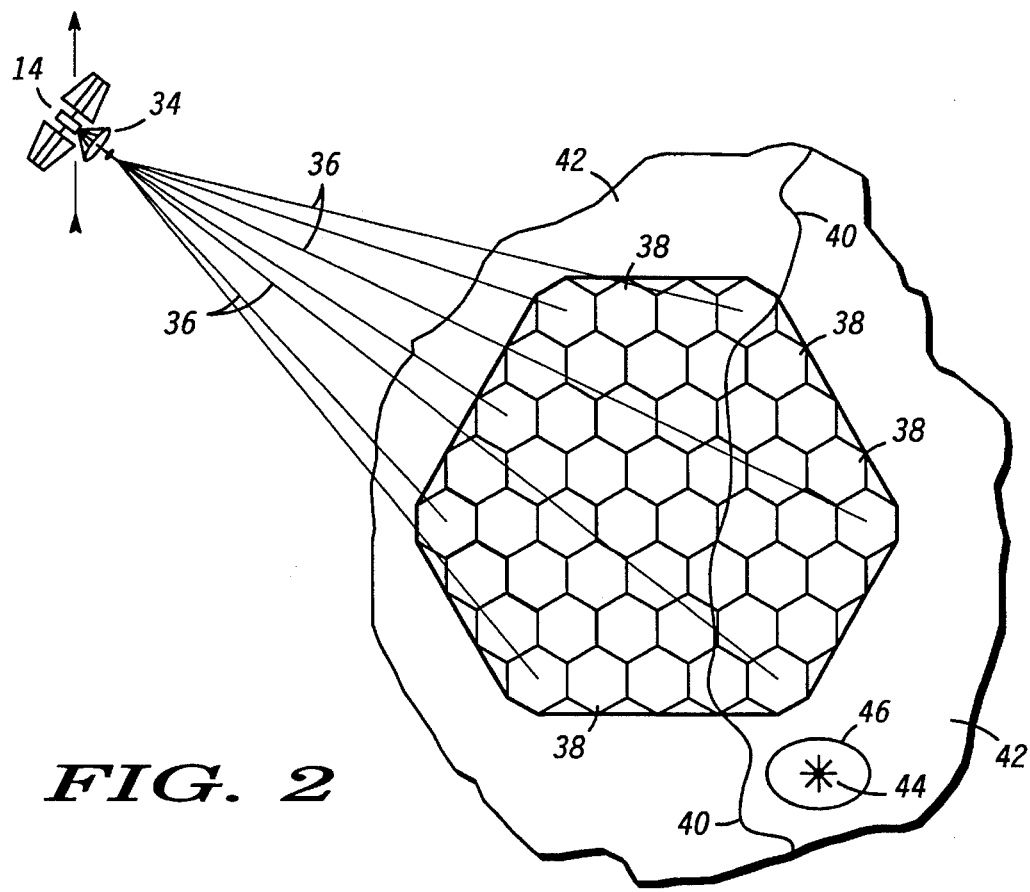
FIG. 2 shows a schematic representation of a cellular pattern formed on the surface of the earth by a satellite portion of the communication system.

FIG. 2 schematically shows a cellular footprint pattern 32 formed on the surface of the earth by a single satellite 14. Each satellite 14 includes a multibeam antenna 34. Each antenna 34 projects numerous discrete antenna beams or patterns 36 toward the earth's surface at numerous diverse angles away from its satellite 14. FIG. 2 shows a diagram of a resulting pattern of cells 38 that beams 36 form on the surface of the earth. Each beam 36 is associated with a cell 38 in a one-to-one correspondence. In a preferred embodiment of the present invention, all satellites 14 are configured substantially as depicted in FIG. 2. Thus, other satellites 14 (not shown) form similar footprints (not shown). Desirably, a continuous blanket of cells 38 substantially covers the entire surface of the earth. Each cell 38 within footprint 32 occupies a unique position within footprint 32. These positions are distinguished from one another through the use of a cell ID, listed as 1 through 48 in FIG. 2. Of course, any number of cells 38 may be included in a footprint 32.

For clarity, the schematic diagram of FIG. 2 illustrates cells 38 and footprint 32 as being discrete, generally hexagonal shapes without overlap or gaps. However, those skilled in the art will understand that in actual practice equal strength lines projected by beams 36 from antennas 34 of satellites 14 may actually have a shape far different from a hexagonal shape, that antenna side lobes may distort the pattern, that some cells 38 may cover larger areas than other cells 38, and that overlap between adjacent cells may be expected.

System 10 (see FIG. 1) communicates through satellites 14 with subscriber units 24 (see FIG. 1) using the electromagnetic spectrum. This communication takes place through antenna 34 and beams 36. Those skilled in the art will appreciate that multiple beams 36 formed by antenna 34 define a geometry and do not imply a particular direction of communication. In other words, communications may be transmitted and/or received through the beams 36 projected by antenna 34 toward the earth's surface.

This communication uses only a limited amount of the electromagnetic spectrum. The precise parameters of this spectrum are unimportant to the present invention and may vary from system to system. The preferred embodiments of the present invention divide this spectrum into discrete portions or channel sets. For example, the spectrum may be divided into discrete frequency bands, discrete time slots, discrete coding techniques, or a combination of these. The precise manner of dividing this spectrum is also unimportant to the present invention. Desirably, each of these discrete channel sets is orthogonal to all other channel sets. In other words, simultaneous communications may take place at a common location over every channel set without significant interference. As is conventional in cellular communication systems, the channel sets are assigned to cells 38 through a reuse scheme which prevents adjacent cells 38 from using the same channel sets. However, common channel sets are reused in spaced apart cells 38 to efficiently utilize the allocated spectrum.

On the surface of the earth a boundary 40 separates a first service control area 42 from a second service control area 42. In the preferred embodiment, one or more SOs 16 service a single service control area 42, and no SOs 16 service an area that extends over a boundary 40. Any number of boundaries 40 may divide the entire earth's surface into any number of different service control areas 42. Boundaries 40 need not represent physical phenomena of the earth. Rather, boundaries 40 represent lines imposed over the geography of the earth to achieve some of the goals of system 10 (see FIG. 1). Since different geopolitical entities, such as countries or groups of countries, may wish to exert differing influences on the communication services delivered by system 10 within their jurisdictions, boundaries 40 typically follow geopolitical boundaries.

As discussed below, system 10 qualifies communication services provided to a subscriber unit 24 in accordance with the service control area 42 in which the subscriber unit 24 currently resides. This qualification is based upon location data which are produced to describe a position 44 for the subscriber unit 24. As is conventional in location determination systems, such location data probably do not describe the subscriber unit's true position. Rather, such data are associated with an area of uncertainty 46, and the true position of subscriber unit 24 probably resides somewhere near the reported position within area of uncertainty 46. The problem of qualifying communication services based on subscriber unit location is complicated when the area of uncertainty 46 overlies a boundary 40 because system 10 cannot confidently identify the service control area 42 within which the subscriber unit 24 resides.

Figure 3:
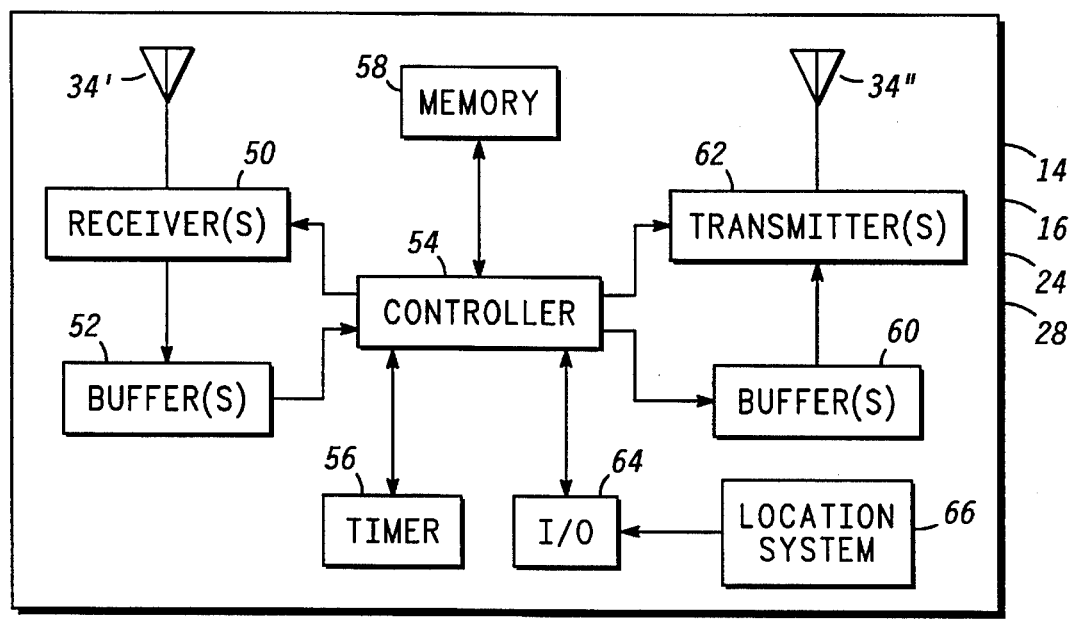
FIG. 3 shows a block diagram of various nodes of the communication system.

FIG. 3 shows a block diagram of any node 48 of communications system 10 (see FIG. 1). As discussed above, any subscriber unit 24, satellite 14, SO 16, or SIM 28 represents a node of system 10. Node 48 includes one or more receivers 50. Receivers 50 couple to an antenna 34' to receive signals from communication links 18, 20, and/or 26 (see FIG. 1). While a subscriber unit 24, SO 16, or SIM 28 may include only a single receiver 50, a satellite 14 includes many receivers for simultaneously communicating over numerous different ones of links 18, 20, and 26 (see FIG. 1). Antenna 34' desirably is or includes a multibeam antenna in satellite 14. Receivers 50 couple to receive buffers 52, which temporarily store data received at receivers 50 until these data can be processed.

A processor or controller 54 couples to receive buffers 52 and to receivers 50. Controller 54 couples to receivers 50 to control receive parameters, such as frequency, timing, and the like. Controller 54 additionally couples to a timer 56, a memory 58, transmit buffers 60, and transmitters 62. Controller 54 uses timer 56 to help monitor real time through maintaining the current date and time. Memory 58 includes data which serve as instructions to processor or controller 54 and which, when executed by processor or controller 54, cause node 48 to carry out processes which are discussed below. In addition, memory 58 includes variables, tables, and databases that are manipulated due to the operation of node 48. Desirably, at least a portion of memory 58 is configured as nonvolatile read/write memory. Transmit buffers 60 are used to temporarily store data placed therein by controller 54. Controller 54 couples to transmitters 62 to control transmit parameters, such as frequency, timing, and the like. While subscriber units 24, SOs 16, and SIMs 28 may include only one transmitter 62, satellites 14 desirably include numerous transmitters 62 for simultaneously communicating over numerous different ones of links 18, 20, and 26 (see FIG. 1). Transmit buffers 60 also couple to transmitters 62. Transmitters 62 transmit signals modulated to carry the data stored in transmit buffers 60. These signals are transmitted through an antenna 34" over links 18, 20, and 26. For satellite 14, antenna 34" is or includes a multibeam antenna. Those skilled in the art will appreciate that antennas 34' and 34" may actually be implemented together using a single antenna.

In earth-based nodes 48, controller 54 also couples to an I/O section 64. In a subscriber unit 24, I/O section 64 may include microphones, speakers, digitizers, vocoders, decoders, interfaces for external data, and the like. Likewise, I/O section 64 may include a keypad for controlling the operation of subscriber unit 24 by a user. In an SO 16 or SIM 28, I/O section 64 may include keyboards, displays, magnetic memory devices, printers, and other devices conventionally coupled to computerized equipment. In an SO 16, I/O section 64 may additionally include components for coupling to a PSTN 22 (see FIG. 1).

A location system 66 may, in one embodiment of the present invention, couple to I/O section 64 of a subscriber unit 24. Location system 66 represents a Global Positioning System (GPS), Loran system, aircraft navigation system, or other location system which may generate data that describe current locations for a subscriber unit 24. In yet another embodiment of the present invention where a subscriber unit may be positioned at a permanent location, location data which describe this permanent location may be stored in the subscriber unit's memory 58. In still another embodiment of the present invention, location data may be generated through communications between a subscriber unit 24 and a satellite 14. Doppler and/or propagation delay measurements may be made of such communications, and such measurements when combined with the time when the measurements were made serve as location data because they may be processed to yield a location for the subscriber unit 24.

In short, each node 48 of system 10 may represent a programmable machine which takes on the character assigned to it by software programming located in memory 58 and executed by processor or controller 54. FIGS. 4–11 illustrate procedures and memory structures carried out by various nodes 48 of system 10. In the preferred embodiments of the present invention, all subscriber units 24 independently perform substantially the same processes. Likewise, all satellites 14, SOs 16, and SIMs 28 (see FIG. 1) perform substantially the same procedures as other satellites 14, SOs 16, and SIMs 28, respectively. Thus, while the description presented below is directed toward a single unit 24, satellite 14, SO 16, and SIM 28, it generally applies to all respective nodes 48. Those skilled in the art will appreciate that programming instructions stored in memory 58 (see FIG. 3) of the node 48 that serves as a subscriber unit 24, satellite 14, SO 16, or SIM 28 control the processes discussed below in connection with FIGS. 4–11.

Figure 4:
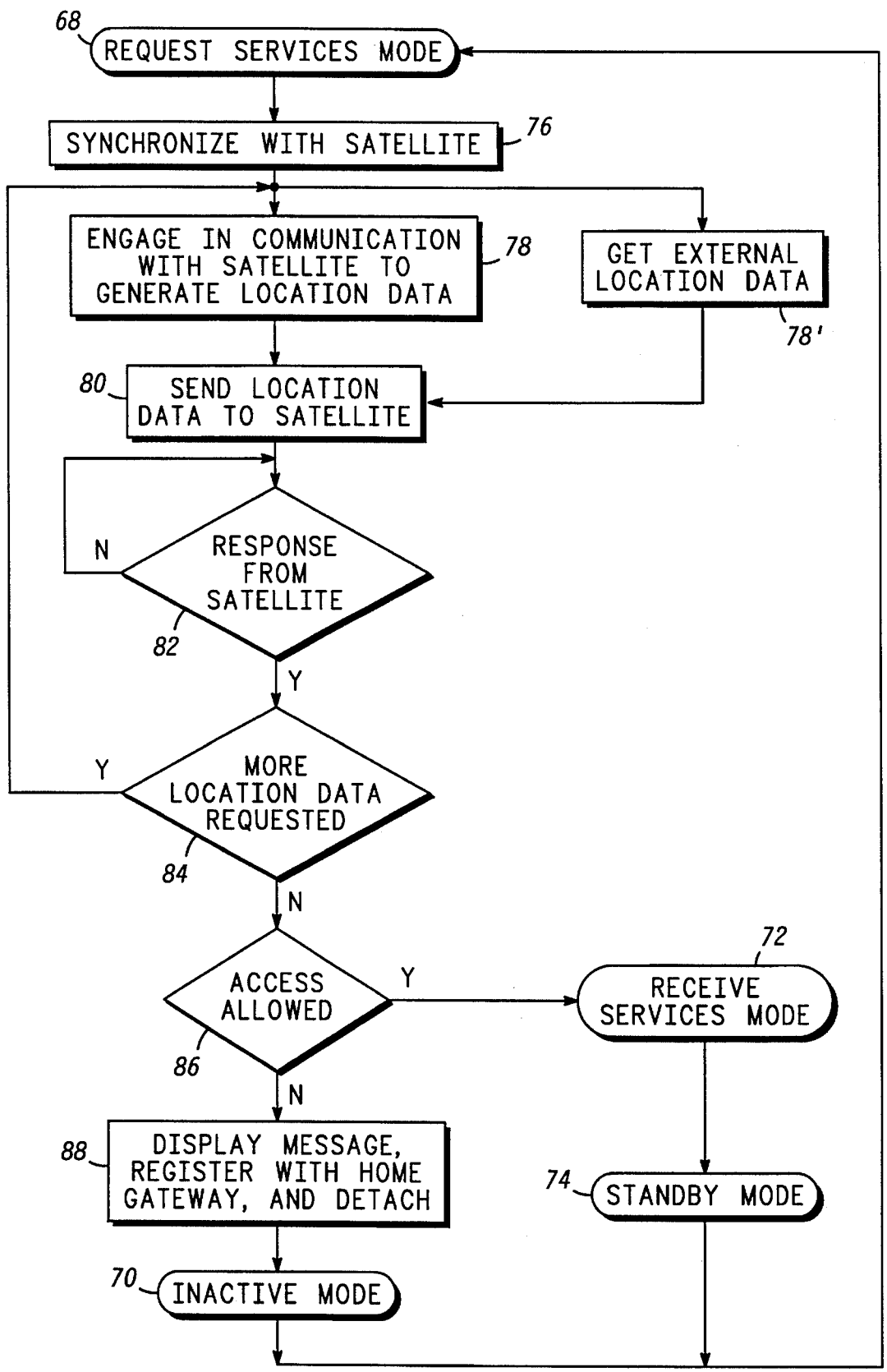
FIG. 4 shows a flow chart of a procedure performed by a subscriber unit node of the communication system while the subscriber unit operates in a request services mode.

FIG. 4 shows a flow chart of a procedure 68 performed by a subscriber unit 24 while the subscriber unit 24 operates in a request services mode. Generally speaking, subscriber unit 24 operates in four modes. In request services mode 68, subscriber unit 24 asks system 10 to grant access to the communication services system 10 provides. Subscriber unit 24 enters mode 68 when it desires to request services, such as registration, termination, or connection, of an incoming call, or termination of an outgoing call, from system 10. If access is denied, subscriber unit 24 operates in an inactive mode 70. If access is granted, subscriber unit 24 operates in a receive services mode 72. After services have been received, subscriber unit 24 operates in a standby mode 74.

Subscriber unit 24 performs procedure 68 when it desires to receive services from system 10. Subscriber unit 10 may want system 10 to terminate an outgoing call when a user manipulates a keypad in I/O section 64 (see FIG. 3) to indicate dialing a phone number. Subscriber unit 10 may want system 10 to terminate an incoming call when it monitors signals from a satellite 14 (see FIG. 1) that indicate a call is being directed to it. In addition, subscriber unit 24 may want system 10 to provide registration services when it determines that it has moved a predetermined distance away from its last location known by system 10. In other words, subscriber unit 24 performs procedure 68 when it is about to engage in communications with system 10.

During procedure 68, subscriber unit 10 performs a task 76 to synchronize its operation with that of a nearby satellite 14. Through this synchronization task, subscriber unit 24 adjusts its frequency and timing parameters for successful communication with the satellite 14. After task 76, subscriber unit 24 performs either a task 78 or a task 78' depending upon which embodiment of the present invention is being implemented by subscriber unit 24.

When subscriber unit 24 is configured in accordance with a system-calculated-location embodiment of the present invention, procedure 68 performs task 78 to engage in communication with satellite 14 for the purpose, at least in part, of generating location data. In this system-calculated-location embodiment, location data take the form of Doppler and/or propagation delay measurements for the electromagnetic signals traveling between subscriber unit 24 and satellite 14, along with time stamps describing when the measurements were made. System 10 processes such location data to determine a location for subscriber unit 24.

When subscriber unit 24 is configured in accordance with an externally-supplied-location embodiment of the present invention, procedure 68 performs task 78' to get externally determined location data. Such externally determined location data may be provided by location system 66 (see FIG. 3) or they may be obtained from the subscriber unit's memory 58 (see FIG. 3). In this embodiment, the location data describe a current location for subscriber unit 24 with little or no subsequent processing by the other components of system 10. The location data may, for example, indicate a latitude and longitude for subscriber unit 24 or they may simply identify a service control area 42 (see FIG. 2).

Regardless of the specific embodiment implemented by subscriber unit 24, tasks 78 or 78' produce location data. Such location data describe a position 44 (see FIG. 2) that is associated with an error ellipse or area of uncertainty 46 (see FIG. 2). The shape, size, and location of area of uncertainty 46 may be either expressed in the location data or implied from the location data and knowledge about the manner in which location is being determined After task 78 or 78' whichever applies, a task 80 sends the location data to the satellite 14 in the form of a message that requests service from system 10. The request message additionally includes an identity (ID) for the subscriber unit 24 making the request and may optionally indicate the type of service being requested from system 10. However, location data may alternatively have been sent to or measured at satellite 14 during task 78. As discussed below, satellite 14 sends the location data in the form of a request services message to the home SIM 28 (see FIG. 1) for the requesting subscriber unit 24.

After task 80, procedure 68 remains at a query task 82 until a response is received from the satellite 14. However, conventional error handling processes (not shown) may be used to prevent procedure 68 from becoming stuck in a programming loop. When a response arrives, a query task 84 evaluates the response to determine if the response represents an instruction to send more location data. If more location data are being requested, program control loops back to task 78 or 78', whichever applies, to generate additional location data.

If task 84 determines that the response is not requesting more location data, then a query task 86 evaluates the response to determine if access to the communication services provided by system 10 has been allowed or denied. As discussed below, the allowance or denial decision is made at the subscriber unit's home SIM 28 and at the SO 16 serving the service control area 42 (see FIG. 2) where the subscriber unit 24 currently resides. During task 86 subscriber unit 24 evaluates the decision that is made elsewhere.

If task 86 determines that access has not been allowed, a task 88 displays an appropriate message at a display in I/O section 64 (see FIG. 3) of subscriber unit 24. In addition, during task 88 subscriber unit 24 desirably registers at its home gateway 30 (see FIG. 1), and detaches from registration at any other gateway 30. The registration at the home gateway 30 may be accompanied with status data which inform the home gateway 30 that subscriber unit 24 is currently been denied access to the services provided by system 10. Registration at a home gateway 30 and detachment from any other gateway 30 to which the subscriber unit 24 may have been temporarily assigned allows system 10 to consume fewer resources in managing the denied-access subscriber unit 24.

After task 88, program control proceeds to inactive mode 70. At some point in the future, in response to the passage of time or other stimuli, subscriber unit 24 may exit inactive mode 70 and return to request services mode 68.

When task 86 determines that access has been allowed, program control proceeds to receive services mode 72. In mode 72, subscriber unit 24 performs tasks (not shown) which relate to the services being requested from system 10. Such services may include registration, termination of an incoming call, or termination of an outgoing call. After the requested services have been received, program control proceeds to standby mode 74. In mode 74 subscriber unit 24 monitors signals broadcast from satellites 14 (see FIG. 1) to determine whether an incoming call is being directed to it or possibly to determine whether subscriber unit 24 has moved a predetermined distance away from its last location known by system 10. In addition, in mode 74 subscriber unit 24 monitors its I/O section 64 (see FIG. 3) to determine if a user is attempting to make an outgoing call. If, from such monitoring, subscriber unit 24 determines that it requires services from system 10, it then returns to request services mode 68.

Figure 5:
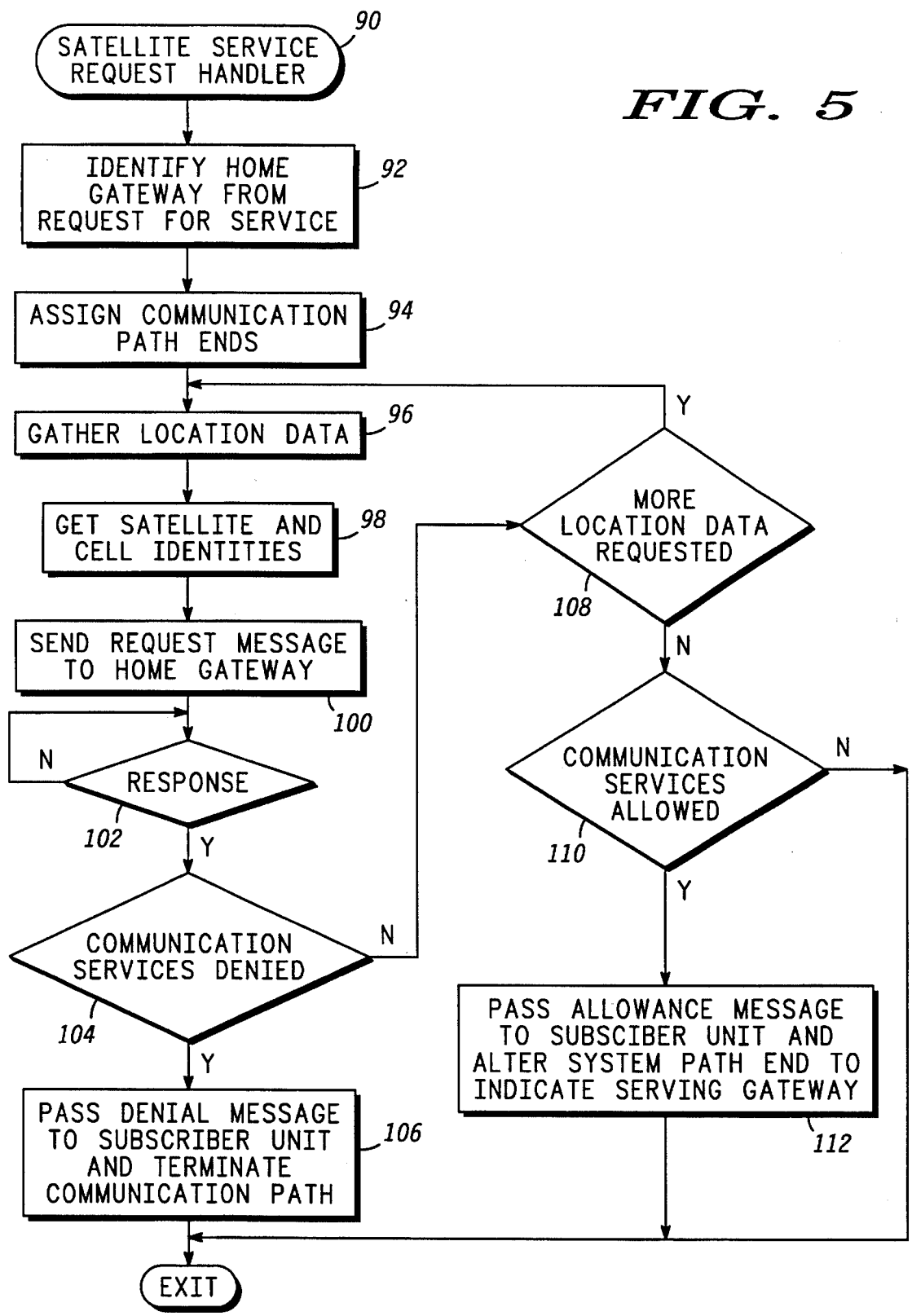
FIG. 5 shows a flow chart of a satellite service request handler.

FIG. 5 shows a flow chart of a satellite service request handler 90 which is performed by a satellite 14 (see FIG. 1) that receives a request for services from a subscriber unit 24. The request for services is received in accordance with task 80, discussed above in connection with FIG. 4. As shown in FIG. 5, handler procedure 90 performs a task 92 to identify the home gateway 30 (see FIG. 1) of the subscriber unit 24 requesting service. In the preferred embodiments of the present invention, each subscriber unit 24 is permanently assigned to its home gateway 30, and its ID is configured to identify the home gateway 30 to which it has been assigned as well as to uniquely identify it. Satellite 14 may examine the subscriber unit's ID obtained in the service request to identify the home gateway 30.

After task 92, a task 94 assigns communication path ends. By assigning path ends, satellite 14 allocates communication channels through links 18, 20, and 26 (see FIG. 1) so that communications may be routed between the subscriber unit 24 and home gateway 30. Next, a task 96 gathers location data, either from the service request or by measurement as discussed above in connection with tasks 78 and 78' (see FIG. 4). After task 96, a task 98 gets the identity of the satellite 14 that has received the service request and of the cell 38 (see FIG. 2) from which the service request, including location data, has been transmitted. The cell identity corresponds to the beam 36 (see FIG. 2) over which communications have been taking place between the satellite 14 and subscriber unit 24.

Next, a task 100 sends the request message over the communication network of links 18 and 26 to the home gateway 30 identified above in task 92. This request message desirably conveys a request for service, the identity of the subscriber unit making the request, location data, the identity of the satellite 14 used in making the request, and the identity of the cell used in communicating with the subscriber unit 24. In addition, the request message desirably conveys a time stamp and an indication of the purpose for making the request.

After task 100, program control waits at a query task 102 until satellite 14 receives a response regarding the service request. The connection or path between the subscriber unit 24 and home gateway 30, defined above in task 94, desirably remains open. In other words, system resources remain assigned to the connection and remain available for future communications. Of course, those skilled in the art will appreciate that by waiting at task 102, satellite 14 is not prevented from simultaneously performing other tasks (not shown) which may relate to the management of communication services for other subscriber units 24, SOs 16, and the like. Moreover, conventional error handling processes (not shown) may be employed to prevent satellite 14 from becoming stuck in a programming loop.

When a response is received, program control proceeds from task 102 to a query task 104. Task 104 evaluates the response to determine whether communication services have been allowed or denied. If services have been denied, handler 90 performs a task 106 to pass the denial message on to the subscriber unit 24 and to terminate the connection between the subscriber unit 24 and its home gateway 30. The termination of the connection frees system resources so that they may be used by other subscriber units 24.

When task 104 determines that services have not been denied, a query task 108 evaluates the response to determine whether more location data are being requested. If so, program control loops back to task 96 to gather additional location data and send the additional location data on to the home gateway 30. If query task 108 determines that more location data is not being requested, a query task 110 determines whether communication services have been allowed, which is the normal situation. If the response indicates that communication services are not being allowed, then some other request is being conveyed, and program control exits handler 90 to address this other request.

If communication services are allowed, then a task 112 passes the allowance message on to the subscriber unit 24. In addition, task 112 may alter the path ends previously established during task 94 to indicate a connection between the subscriber unit 24 and an SO 16 (see FIG. 1). The identity of the SO 16 where the path end now points is conveyed by the response message received by the satellite 14. After task 112, the request for service has been handled, and program control exits handler 90.

Figure 6:
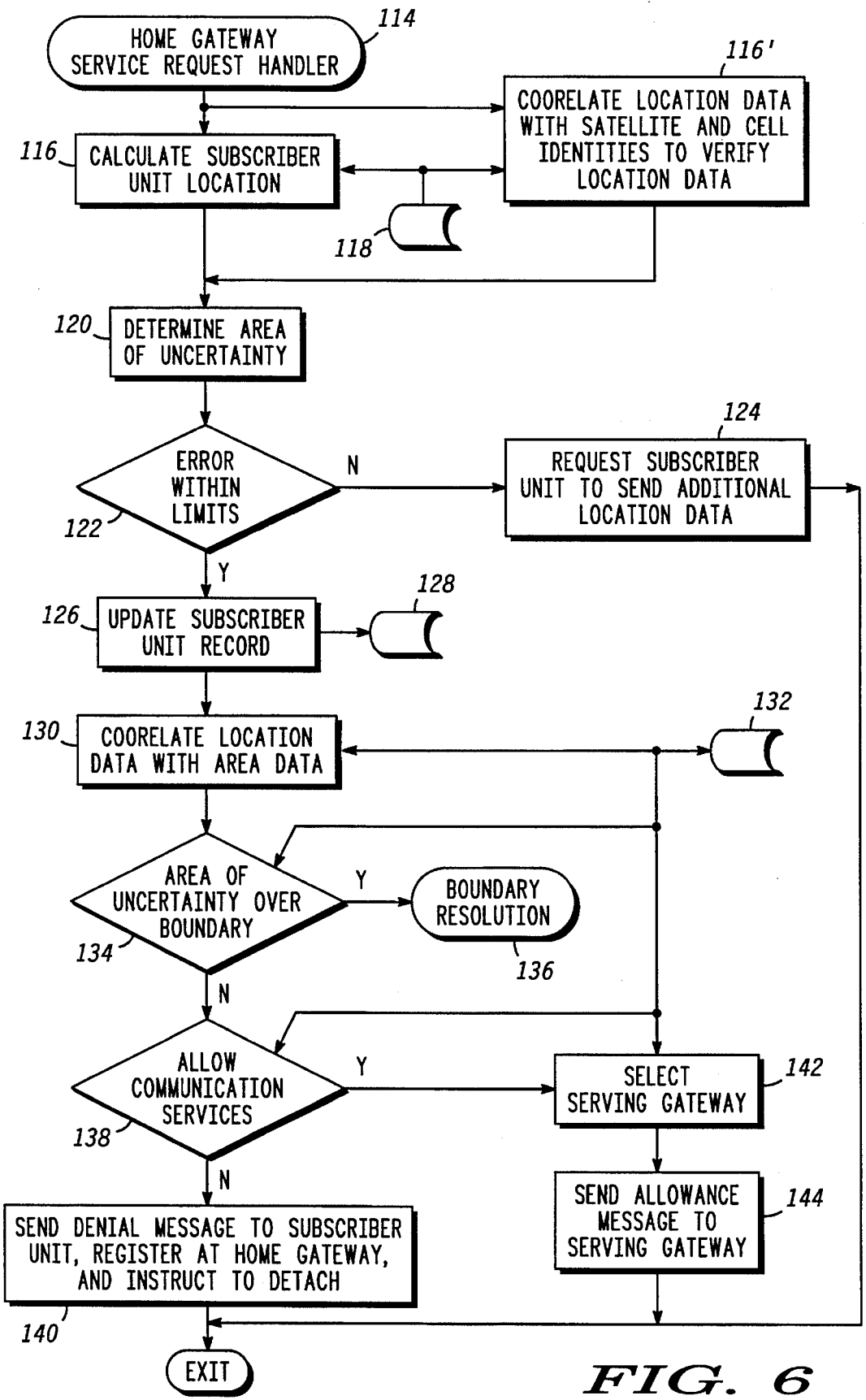
FIG. 6 shows a flow chart of a home gateway service request handler.

FIG. 6 shows a flow chart of a home gateway service request handler 114. It is the SIM 28 in the subscriber unit's home gateway 30 (see FIG. 1) that receives the service request discussed above in connection with FIGS. 4 and 5. It is also the home SIM 28 that has primary responsibility for qualifying the communication services provided for the subscriber unit by system 10 and for appropriately selecting a serving SO 16 for involvement in providing the services.

Home SIMs 28 are chosen to perform these qualification and selection functions for several reasons. For example, data processing at home SIMs 28 is distributed throughout system 10, and the distribution of this processing makes system 10 more reliable than if system 10 relied on centralized data 10 processing. Furthermore, processing at home SIMs 28 is more reliable and less susceptible to fraud and other abuses than it would be if performed at serving SOs 16 or subscriber units 24. By having home SIMs 28 make decisions regarding the qualification of services and 15 selection of serving SOs 16, entities directly affected by the decisions are less involved in making the decisions. Consequently, more reliable and fair decisions result.

As shown in FIG. 6, handler 114 performs either a task 116 or 116' depending upon the embodiment of the present invention encountered in the request for service. In the system-calculated-location embodiment, discussed above in connection with task 78 (see FIG. 4), task 116 is performed to calculate a location for the subscriber unit 24. The calculations of task 116 are performed using data conveyed to home SIM 28 in the service request. The results of the calculations are data describing position 44 (see FIG. 2).

In the externally-supplied-location embodiment, discussed above in connection with task 78' (see FIG. 4), task 116' correlates the location data supplied by the service request with the satellite 14 and cell 38 (see FIG. 2) identities also provided in the service request. The correlation is performed to verify the location data. Thus, system 10 can protect itself from subscriber units 24 that fraudulently misreport their true locations in an attempt to receive a favorable qualification for services or a favorable rate by being recognized in one service control area 42 (see FIG. 2) rather than another. If the location data cannot be verified, handler 114 may perform an appropriate error routine (not shown) to address the potential problem.

Tasks 116 and/or 116' may use an ephemeris table 118 in performing their calculations and/or correlations. Table 118 may desirably be kept on-line in memory 58 (see FIG. 3) of the home SIM 28. FIG. 7 shows an exemplary block diagram of ephemeris table 118. Satellites 14 move in relatively stable and predictable orbits around the earth. Thus, the positions of satellites 14 may be worked out in advance and stored in association with the times at which the satellites 14 will be at those positions. Accordingly, table 118 may record the location of each beam 36 (see FIG. 2) of each cell 38 (see FIG. 2) of each satellite 14 (see FIG. 2) for various points in time. Task 116 may consult table 118 to relate a location calculated relative to a satellite 14 to earth-based coordinates. Task 116' may consult table 118 to determine whether a position 44 (see FIG. 2) reported in location data is within a predetermined distance of a location reported for a cell 38 that was used in communicating with the subscriber unit.

Referring back to FIG. 6, after task 116 or 116', a task 120 is performed to determine area of uncertainty 46 (see FIG. 2) for the position 44 (see FIG. 2) attributed to the subscriber unit 24. Area of uncertainty 46 may be determined in connection with the calculations performed in task 116. Alternatively, area of uncertainty may be a predetermined area which may be constant or which may vary in accordance with the manner in which external location data were generated. Task 120 desirably defines a size, shape, and location for area of uncertainty 46. Position 44 typically resides in the central region of area of uncertainty 46.

Next, a query task 122 evaluates area of uncertainty 46 to determine whether the location error is within limits that are acceptable to system 10. The precise parameters which make errors too large or small are not important to the present invention. However, if task 122 determines that area of uncertainty 46 indicates too great an error, a task 124 sends a message back to the satellite 14 that requests the subscriber unit 24 and satellite 14 to send additional location data. After task 124, program control exits handler 114.

However, when the additional location data are received at home SIM 28, handler 114 will again be performed. In the subsequent iteration of handler 114, the additional location data may be combined with the original location data. As is conventional in statistical determinations, an increase in data points leads to a decrease in error. Consequently, by combining the additional location data with previously obtained location data, by averaging or otherwise, area of uncertainty 46 shrinks until task 122 determines that the error is within acceptable limits. Of course, conventional error handling routines (not shown) may be employed to prevent an infinite loop from forming.

When task 122 determines that error is within limits, a task 126 updates a subscriber record in a permanent subscriber unit database 128 to indicate the new position 44 (see FIG. 2). FIG. 8 shows a block diagram of an exemplary permanent subscriber unit database 128, which may be stored in memory 58 of home SIM 28. Database 128 is used to permanently assign subscriber units 24 to their home SIMs 28. A vast variety of data describing subscriber units 24 may be kept in individual records for each subscriber unit 24 assigned to a home SIM 28. For example, the subscriber records may include a subscriber ID, features subscribed to by the subscriber unit 24, a current status of the subscriber unit 24, a last known location for the subscriber unit 24, and an identity for a serving gateway 30 to which the subscriber unit 24 is currently assigned temporarily. In addition, database 128 may include time stamps and other data that relate to the subscriber units 24 and to the maintenance of these data. Conventional database management techniques may be used to store data in database 128 and to maintain that data.

Those skilled in the art will appreciate that the permanence of the assignment of a subscriber unit 24 to its home SIM 28 is to be understood in relation to the temporary assignment that occurs in connection with serving SOs 16. In particular, a subscriber unit 24 is permanently assigned to its home SIM 28. This assignment remains in force regardless of where the subscriber unit 24 may roam throughout the area covered by system 10. On the other hand, subscriber units 24 are also assigned temporarily to serving SOs 16. The SOs 16 are selected in response to the current location of the subscriber unit 24. As the subscriber unit 24 moves from one service control area 42 to another service control area 42 (see FIG. 2), this temporary assignment changes so that the subscriber unit 24 is temporarily assigned to the SO 16 within whose service control area 42 the subscriber unit 24 currently resides. In this relative sense, the assignment of the subscriber unit 24 to its home SIM 28 is permanent. However, those skilled in the art will appreciate that nothing prevents the permanent assignment from changing if system 10 may benefit from such a change.

Referring back to FIG. 6, after task 126, a task 130 correlates the location data from tasks 116 or 116' with area data. In particular, the area data used by task 130 define the service control areas 42 (see FIG. 2) served by system 10. Such data are obtained from a service control area database 132, a block diagram of which is shown in FIG. 9. The correlation performed by task 130 identifies the service control area 42 within which position 44 (see FIG. 2) resides.

After task 130, a query task 134 determines whether a portion of area of uncertainty 46 (see FIG. 2) overlies a boundary 40 between service control areas 42. If area of uncertainty 46 overlies a boundary 40, then system 10 cannot be sure in which of the two or more service control areas 42 whose boundaries 40 are overlaid by area of uncertainty 46 subscriber unit 24 resides. Consequently, program control proceeds to a boundary resolution procedure 136, which is discussed below in connection with FIG. 10, to resolve the uncertainty.

When task 134 determines that area of uncertainty 46 does not overlie a boundary 40, a query task 138 qualifies the request for service. In particular, task 138 decides whether to allow the subscriber unit 24 to have access to the communication services provided by system 10. Task 138 makes its determination in response to the location data, which indicate which service control area 42 to consider in qualifying the subscriber unit 24. Task 138 may consult service control area database 132 (see FIG. 9) in making its decision. Database 132 may associate the identified service control area with a set of allowance and boundary rules. The allowance rules desirably indicate when to allow and deny communication services. For example, some service control areas may permit communication services for all but a specified set of subscriber units, such as those having a particular home SIM 28. Other areas may deny service to all subscriber units 24.

When task 138 decides not to allow access to communication services, a task 140 sends an appropriate denial message to the subscriber unit 24. As discussed above, the denial message may also instruct the subscriber unit to register with the home gateway 30 and detach from any SO 16 to which it may be temporarily assigned to conserve system resources. After task 140 program control exits handler 114.

When task 138 decides to allows access to communication services, a task 142 selects a serving SO 16 of a gateway 30 for temporary assignment of the subscriber unit 24. The serving SO 16 is selected in response to the location data. The SO 16 which serves the service control area 42 where the subscriber unit 24 currently resides is the one selected. Its identity may be determined from service control area database 132 (see FIG. 9).

After task 142, a task 144 sends an appropriate allowance message to the serving gateway 30 where the subscriber unit 24 is being temporarily assigned. The allowance message informs the SO 16 that a subscriber unit 24 within its jurisdiction has requested service. The SO 16 will then further qualify the provision of services and inform the subscriber unit 24 when services are allowed. After task 144, program control exits handler 114.

Figure 10:
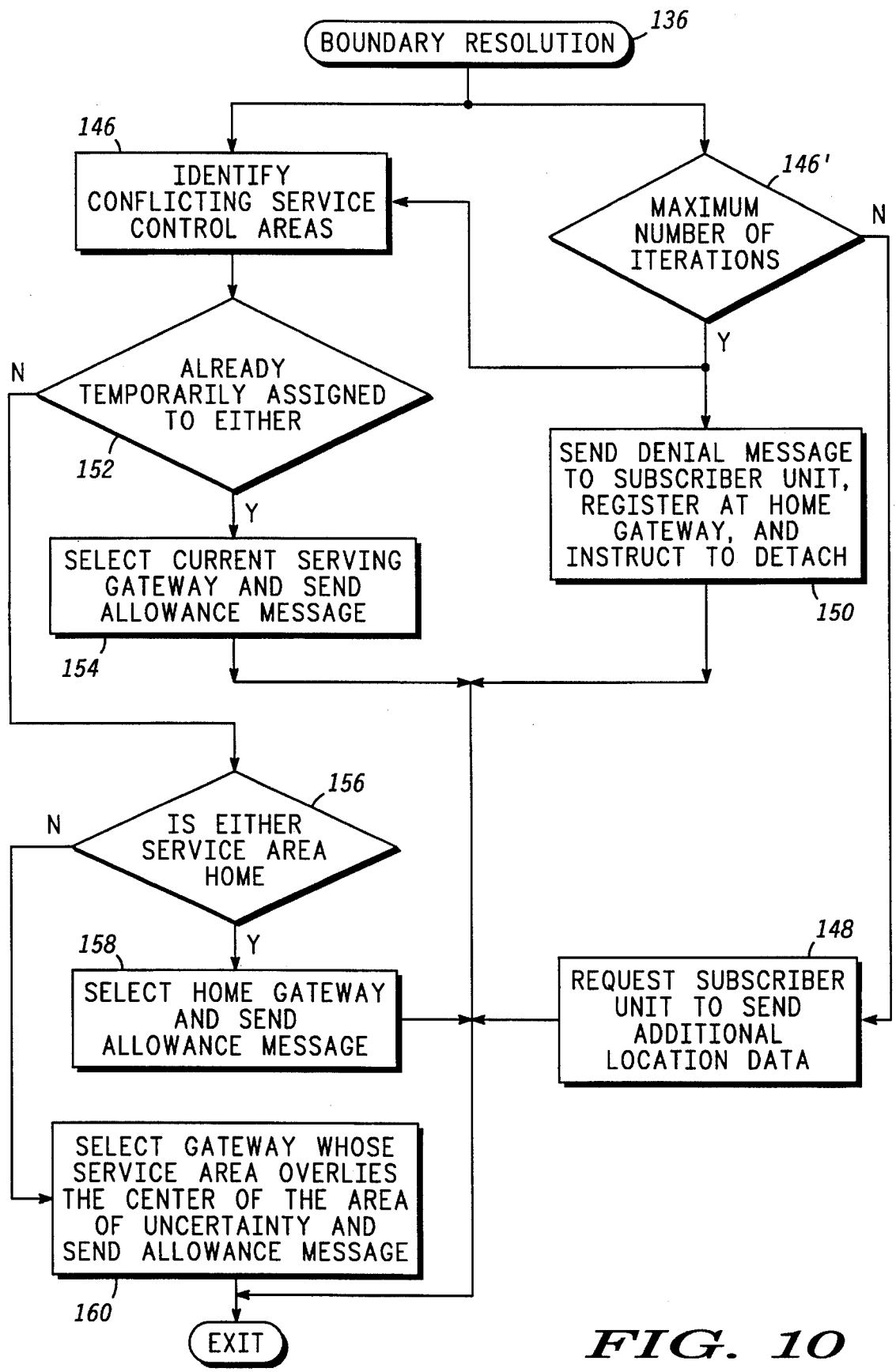
FIG. 10 shows a flow chart of a boundary resolution procedure performed by the home gateway.

FIG. 10 shows a flow chart of boundary resolution procedure 136. Procedure 136 is performed by a SIM 28 when an area of uncertainty 46 for a subscriber unit's position 44 overlies a boundary 40 between two or more service control areas 42 (see FIG. 2). As indicated in FIG. 10, procedure 136 first performs a task 146 or a task 146' depending upon which of various different embodiments of procedure 136 are in force.

The present invention contemplates three boundary resolution embodiments. In a first embodiment, mistakes in precisely locating subscriber units 24 near boundaries 40 are willingly tolerated by the entities responsible for administering communication services on either side of the boundaries. In a second embodiment, mistakes in precisely locating subscriber units 24 near boundaries 40 are grudgingly tolerated, and in a third embodiment, mistakes in precisely locating subscriber units are not tolerated. The precise embodiment to be implemented by the present invention may be determined by agreement by the entities responsible for administering communication services on either side of common boundaries 40. The agreed-upon embodiment may be indicated in boundary rules specified in service control area database 132 (see FIG. 9).

When the first embodiment is indicated, procedure 136 first performs a task 146. However, when the second or third embodiments are indicated, procedure 136 first performs a query task 146'. Task 146' determines whether a maximum number of iterations have been performed for the request for services. If the maximum number has not yet been reached, then a task 148 is performed to request the subscriber unit to send additional location data. After task 148, program control exits procedure 136. As discussed above in connection with task 124 (see FIG. 6), the additional location data may be combined with earlier-obtained location data to shrink area of uncertainty 46. If sufficient data are gathered, area of uncertainty 46 may shrink to the point where area of uncertainty 46 no longer overlies a boundary 40. At this point, program control proceeds from task 134 to 138 (see FIG. 6).

On the other hand, if area of uncertainty 46 continues to overlie a boundary 40 after being shrunk through the gathering of additional location data, task 146' will eventually decide that the maximum number of iterations has been reached. The maximum number is established to limit the amount of system resources that will be consumed to determine location. At this point, the second embodiment implementation proceeds to task 146, but the third embodiment implementation proceeds to a task 150. Task 150 sends a denial message to the subscriber unit 24 and instructs the subscriber unit 24 to register with its home gateway 30 and detach. After task 150, program control exits procedure 136. Accordingly, for the third embodiment, if a subscriber unit's location cannot, with a high degree of confidence, be determined as being in a particular service control area 42, service is denied.

Task 146 is always performed for the first embodiment and is performed for the second embodiment when the subscriber unit's location cannot be precisely resolved within a maximum number of iterations of gathering additional location data. Task 146 identifies two service control areas 42 that have a common boundary 40 which area of uncertainty 46 overlies. Task 146 may consult service control area database 132 (see FIG. 9) in making its identification.

After task 146, a query task 152 determines whether the subscriber unit 24 is already temporarily assigned to an SO 16 for either of these two service control areas. Task 152 may consult permanent subscriber unit database 128 (see FIG. 8) in making its determination. If the subscriber unit 24 is already temporarily assigned in one of the conflicting service control areas 42, a task 154 selects the current serving SO 16, and sends an allowance message. Task 154 substantially repeats tasks 142 and 144, discussed above in connection with FIG. 6. After task 154, program control exits procedure 136. Thus, when the correct service control area 42 cannot be determined with a high degree of confidence, the subscriber unit 24 is temporarily assigned, if possible, to the service control area 42 to which it is already assigned. This assignment is desirable because it consumes the least amount of system resources and prevents temporary assignments from bouncing back and forth across a boundary 42 when a subscriber unit 24 nears the boundary.

When task 152 determines that the subscriber unit 24 is not already temporarily assigned to either of the conflicting service control areas 42, a query task 156 is performed. Task 156 determines whether either of the conflicting areas is served by the gateway 30 for the subscriber unit's home SIM 28. If so, this home gateway 30 is selected and a task 158 sends an allowance message to the SO 16 for the home gateway 30. After task 158, program control exits procedure 136. Thus, when the correct service control area 42 cannot be determined with a high degree of confidence, the subscriber unit 24 is temporarily assigned to its home gateway 30, assuming that it is not already assigned to one of the two conflicting areas 42. This assignment is desirable because the smallest amount of system resources is consumed when a subscriber unit 24 is both temporarily and permanently assigned to the same gateway 30.

When task 156 determines that neither conflicting area is a home area for the subscriber unit 24, a task 160 selects the gateway 30 for the area where the center of area of uncertainty 46 lies and sends an allowance message to temporarily assign the subscriber unit 24 to this gateway 30. This choice is desirable because, between two conflicting service control areas 42, it has the greatest likelihood of being correct. After task 160, program control exits procedure 136.

Accordingly, the process described by tasks 146, 152, 154, 156, 158, and 160 may occasionally make mistakes in temporarily assigning subscriber units to various gateways 30 for various service control areas 42. However, over a large number of calls the mistakes should average out to favor neither area. Moreover, a greater amount of system resources are put to use providing services for subscriber units 24 rather than in system overhead tasks, such as determining subscriber unit locations.

Figure 11:
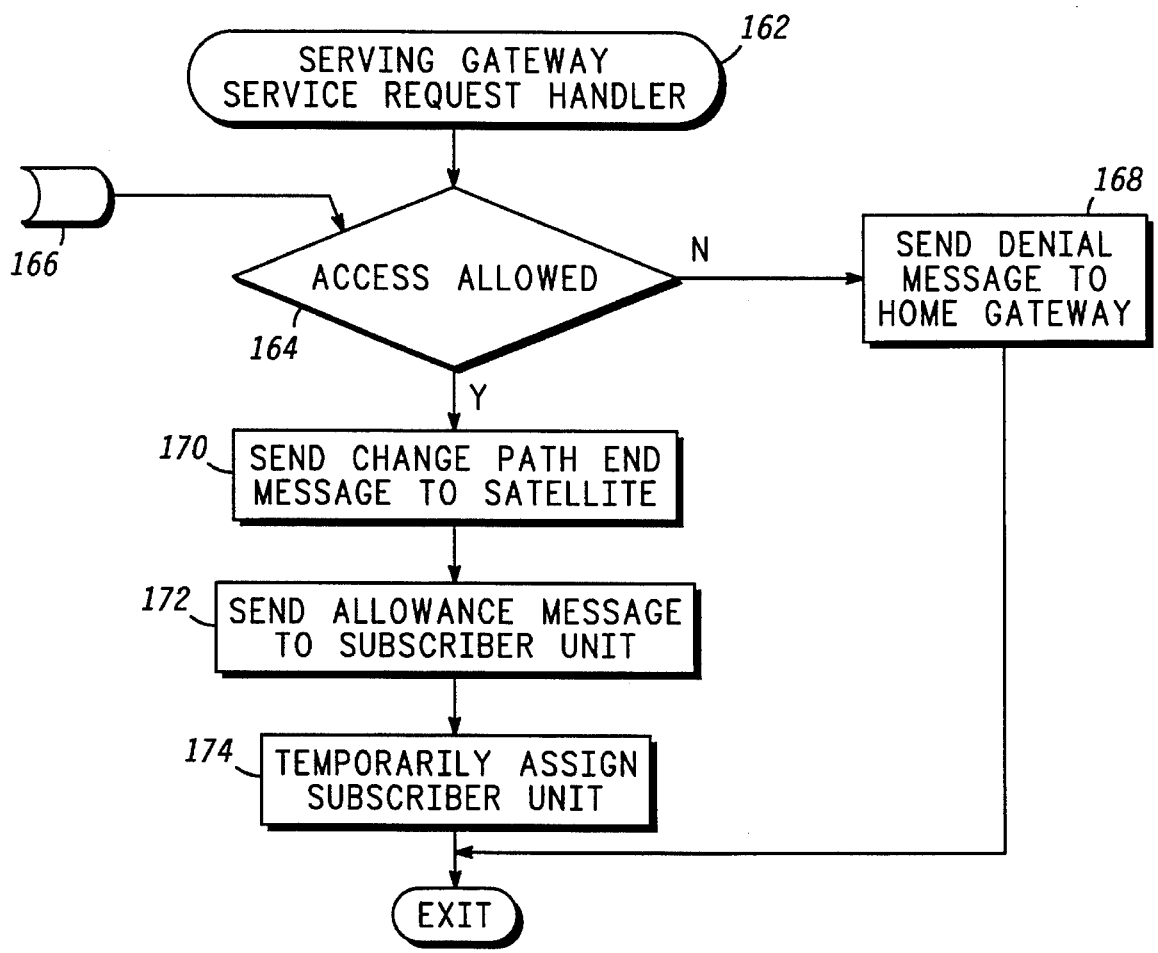
FIG. 11 shows a flow chart of a serving gateway service request handler.

FIG. 11 shows a flow chart of a serving gateway service request handler 162. Handler 162 is performed by an SO 16 when it receives an allowance message from a home SIM 28. The allowance message temporarily assigns a subscriber unit 24 to the SO 16 and informs the SO 16 that the subscriber unit 24 is requesting a service from system 10. Handler 162 performs a query task 164 to further qualify the communication services provided by system 10. Task 164 may consult a database 166 to examine local allowance rules in making its determination. The nature of such rules are not important to the present invention. However, system 10 permits both a system-wide qualification, discussed above in connection with FIGS. 6–10, and a local qualification of services performed by task 164. Thus, the entities responsible for administering communication services in a service control area 42 may maintain control over the provision of those services and are not forced to comply with qualification decisions made elsewhere.

When task 164 determines that access is not to be allowed, a task 168 sends a denial message to the home gateway 30. The home gateway 30 may then update its subscriber unit records and inform the subscriber unit 24 of the denial.

When task 164 determines that access is to be allowed, a task 170 sends a change path end message to the satellite 14 involved in the service request. The change path message is processed by task 112 (see FIG. 5). Future communications will then be directed through the satellite 14 between the SO 16 and subscriber unit 24 rather than between the home SIM 28 and subscriber unit 24. After task 170, a task 172 sends an allowance message to the subscriber unit 24. As discussed above 15 in connection with task 86 (see FIG. 4), the subscriber unit will proceed to its receive service mode of operation to receive the requested services. Next, a task 174 causes the serving SO 16 to update its records to reflect the temporary assignment of subscriber unit 24, the subscriber unit's location, and any other data relevant to the service of the subscriber unit 24 through an SO 16. After task 174, program control exits handler 162.

In summary, the present invention provides an improved radio communication system. The present invention qualifies communication services in response to the locations of subscriber units. More particularly, the present invention allows access or denies communication services based upon a subscriber unit's location. In addition, the present invention selects a switching office that is associated with a particular geographical area to handle communication services for a subscriber unit based upon the subscriber unit's location.

The present invention has been described above with reference to preferred embodiments. However, those skilled in the art will recognize that changes and modifications may be made in these preferred embodiments without departing from the scope of the present invention. For example, those skilled in the art will appreciate that subscriber units 24, satellites 14, home SIMs 28, and SOs 16 may all perform many additional procedures which are not directly related to the present invention and have not been discussed herein. Moreover, those skilled in the art will appreciate that the flow charts presented herein are intended to teach the present invention and that different techniques for implementing program flow that do not necessarily lend themselves to flowcharting may be devised. In particular, each task discussed herein may be interrupted to permit program flow to perform background or other tasks. In addition, the specific order of tasks may be changed, and the specific techniques used to implement the tasks may differ from system to system. These and other changes and modifications which are obvious to those skilled in the art are intended to be included within the scope of the present invention.

What is claimed is:

1. A method of operating a communication system having at least one satellite in an orbit around the earth and having at least one subscriber unit located proximate to the earth's surface, said method comprising the steps of:

generating location data that identify a location of said subscriber unit relative to the earth;

determining an area of uncertainty around the location of said subscriber unit, where the area of uncertainty compensates for in inaccuracies of the generating step;

storing area data that identify geographical areas of the earth;

correlating said location data including said area of uncertainty with said area data;

determining whether the correlating step indicates that said area of uncertainty overlies a boundary between said geographical areas;

when said determining step indicates that the area of uncertainty overlies the boundary between the geographical areas, performing a boundary resolution procedure to determine in which of said geographical areas the communication system will consider said subscriber unit to be located within; and qualifying communication services provided for said subscriber unit in response to said performing the boundary resolution procedure step, wherein the communication services are qualified based on which of said geographical areas the communication system considers said subscriber unit to be located within.

2. A method as claimed in claim 1 wherein said subscriber unit operates in a standby mode, a request services mode, and a receive services mode, and said generating, correlating, and qualifying steps are performed while said subscriber unit operates in said request services mode.

3. A method as claimed in claim 1 wherein said qualifying step comprises the step of determining whether to allow access to communication services provided by said system or to deny access to said communication services.

4. A method as claimed in claim 1 wherein said subscriber unit is a member subscriber unit from a population of subscriber units, said system additionally has a plurality of switching offices, said switching offices being associated with said geographical areas so that each switching office is configured to engage in establishing calls terminated in a corresponding one of said geographical areas, and said system additionally has a plurality of data processors, said data processors and said switching offices being in data communication with one another and with said satellite through a communications network, and said method additionally comprises the steps of:

assigning each of said population of subscriber units to a corresponding one of said data processors; and performing said storing, correlating, and qualifying steps at the one of said data processors to which said member subscriber unit is assigned.

5. A method as claimed in claim 4 wherein:

said qualifying step comprises the step of determining whether to allow access to communication services provided by said system or to deny access to said communication services; and said method additionally comprises the step of selecting, when said qualifying step determines to allow access to said communication services, one of said plurality of switching offices for temporary assignment of said member subscriber unit, said one switching office being selected in response to said location data.

6. A method as claimed in claim 5 additionally comprising the step of qualifying communication services provided for said subscriber unit at said one switching office.

7. A method as claimed in claim 5 wherein a location error is inherent in the step of generating the location data, and said location data identify a position within the area of uncertainty which bounds points at which said subscriber unit could be located with the location error factored into the step of generating, and said selecting step comprises the step of:

temporarily assigning said member subscriber unit to the one of said switching offices to which said member subscriber unit is currently assigned when said area of uncertainty overlies said boundary and when said switching office to which said member subscriber unit is currently assigned is associated with either of said two of said geographical areas.

8. A method as claimed in claim 5 wherein said data processors are associated with said switching offices in a one to one correspondence, a location error is inherent in the step of generating the location data, said location data identify a position within the area of uncertainty which bounds points at which said subscriber unit could be located with the location error factored into the step of generating, and said selecting step comprises the step of:

temporarily assigning said member subscriber unit to the one of said switching offices that corresponds to the one of said data processors to which said member subscriber unit is assigned when said area of uncertainty overlies said boundary and when said switching office that corresponds to the one of said data processors to which said member subscriber unit is assigned is associated with either of said two of said geographical areas.

9. A method as claimed in claim 5 wherein a location error is inherent in the step of generating the location data, said location data identify a position within the area of uncertainty which bounds points at which said subscriber unit could be located with the location error factored into the step of generating, and said selecting step comprises the step of:

temporarily assigning said member subscriber unit to the one of said switching offices that is associated with the one of said geographical areas within which a center of said area of uncertainty resides when said area of uncertainty overlies said boundary.

10. A method of operating a communication system having at least one satellite in an orbit around the earth, at least one subscriber unit located proximate to the earth's surface, a plurality of switching offices, and a plurality of data processors, wherein said subscriber unit is a member subscriber unit from a population of subscriber units, said switching offices are associated with geographical areas of the earth so that each switching office is configured to engage in establishing calls terminated in a corresponding one of said geographical areas, and said data processors and said switching offices are in data communication with one another and with said satellite through a communications network, said method comprising the steps of:

assigning each of said population of subscriber units to a corresponding one of said data processors;

generating location data that identify a location of said subscriber unit relative to the earth, wherein a location error is inherent in the step of generating the location data and, said location data identify a position within an area of uncertainty which bounds points at which said subscriber unit could be located with the location error factored into the step of generating;

storing, at the one of said data processors to which said member subscriber unit is assigned, area data that identify the geographical areas:

correlating, at the one of said data processors to which said member subscriber unit is assigned, said location data with said area data:

qualifying, at the one of said data processors to which said member subscriber unit is assigned, communication services provided for said subscriber unit in response to said correlating step by determining whether to allow access to communication services provided by said system or to deny access to said communication services: and when said qualifying step determines to allow access to said communication services, selecting one of said plurality of switching offices for temporary assignment of said member subscriber unit by determining whether said area of uncertainty overlies a boundary between two of said geographical areas; and generating additional location data when said area of uncertainty overlies said boundary, said additional location data being combined with said location data to shrink said area of uncertainty.

11. A method as claimed in claim 1 wherein:

said location data are generated at said subscriber unit and transmitted to said satellite;

said satellite is configured to identify a cell area from which said location data are transmitted; and said method additionally comprises the step of correlating said cell area with said location data, including said area of uncertainty, to verify that said location data is accurate.

12. A communication system comprising:

a satellite in an orbit around the earth;

a subscriber unit located proximate the earth's surface, said subscriber unit being configured to produce location data that identify a location of said subscriber unit relative to the earth, wherein an area of uncertainty exists around the location of said subscriber unit, the area of uncertainty resulting from inaccuracies in producing the location data; and a data processor in data communication with said satellite and with said subscriber unit, said data processor comprising means for determining the area of uncertainty means for storing area data that identify geographical areas of the earth and means for correlating said location data including the area of uncertainty with said area data, when the means for correlating indicates that the area of uncertainty overlies a boundary between the geographical areas, said data processor further comprising means for performing a boundary resolution procedure to determine in which of the geographical areas the communication system will consider said subscriber unit to be located within, and means for qualifying communication services provided for said subscriber unit in response to the determination of which of the geographical areas the communication system considers said subscriber unit to be located within.

13. A communication system as claimed in claim 12 wherein:

said subscriber unit is a member subscriber unit from a population of subscriber units;

said system additionally has a plurality of switching offices, said switching offices being associated with said geographical areas so that each switching office is configured to engage in establishing calls terminated in a corresponding one of said geographical areas;

said data processor, said switching offices, and said satellite are in data communication with one another; and said data processor includes means for storing data describing said member subscriber unit.

14. A communication system as claimed in claim 13 wherein said data processor is configured to select one of said plurality of switching offices for temporary assignment of said member subscriber unit, said one switching office being selected in response to said location data.

15. A communication system as claimed in claim 14 wherein: said data processor is configured to determine whether to allow access to communication services provided by said system or to deny access to said communication services;

said data processor is further configured to communicate said temporary assignment to said selected switching office when said data processor determines to allow access to said communication services; and said selected switching office is configured to determine whether to allow or deny access to said communication services.

16. A communication system as claimed in claim 12 wherein:

said data processor is further configured to store data that identify a cellular footprint of coverage by said satellite on the earth; and said data processor is further configured to correlate said cellular footprint data with said location data to verify said location data.

17. A method of operating a communication system having at least one satellite in an orbit around the earth, a data processor, a plurality of switching offices, and a population of subscriber units, said satellite, data processor, switching offices, and subscriber units being nodes of a communications network, and said method comprising the steps of:

permanently assigning said population of subscriber units to said data processors so that each subscriber unit is assigned to one of said data processors;

generating location data that identify a location for one of said subscriber units relative to the earth;

determining an area of uncertainty around the location for the one of said subscriber units, where the area of uncertainty compensates for inaccuracies in the generating step;

storing area data at said data processor to which said one subscriber unit is assigned, said area data identifying geographical areas of the earth;

correlating, at said data processor to which said one subscriber unit is assigned, said location data including the area of uncertainty with said area data;

determining whether the correlating step indicates that said area of uncertainty overlies a boundary between said geographical areas:

when said determining step indicates that the area of uncertainty overlies the boundary between the geographical areas, performing a boundary resolution procedure to determine which of the geographical areas the communication system will consider said one subscriber unit to be located within; and selecting one of said plurality of switching offices for temporary assignment of said one subscriber unit, said one switching office being selected by said data processor to which said one subscriber unit is assigned in response to said performing the boundary resolution procedure step, wherein the communication services are qualified base on which of said geographical areas the communication system considers said subscriber unit to be located within.

18. A method as claimed in claim 17 additionally comprising the step of determining whether to allow said one subscriber unit access to communication services provided by said system or to deny access to said communication services, said determining step being responsive to said correlating step and being performed at said data processor to which said one subscriber unit is assigned.

19. A method as claimed in claim 17 additionally comprising the step of qualifying communication services provided for said one subscriber unit, said qualifying step being performed at said one switching office.

20. A method as claimed in claim 17 wherein a location error is inherent in the step of generating the location data, and said location data identify a position within the area of uncertainty which bounds points at which said one subscriber unit could be located with the location error factored into the step of generating, and said selecting step comprises the step of:

temporarily assigning said one subscriber unit to the one of said switching offices to which said member subscriber unit is currently temporarily assigned when said area of uncertainty overlies said boundary and when said switching office to which said one subscriber unit is currently temporarily assigned is associated with either of said two of said geographical areas.

21. A method as claimed in claim 17 wherein said data processors are associated with said switching offices in a one to one correspondence, a location error is inherent in the step of generating the location data, said location data identify a position within the area of uncertainty which bounds points at which said subscriber unit could be located with the location error factored into the step of generating, and said selecting step comprises the step of:

temporarily assigning said one subscriber unit to the one of said switching offices that corresponds to the one of said data processors to which said one subscriber unit is permanently assigned when said area of uncertainty overlies said boundary and when said switching office that corresponds to the one of said data processors to which said one subscriber unit is permanently assigned is associated with either of said two of said geographical areas.

22. A method as claimed in claim 17 wherein a location error is inherent in the step of generating the location data, said location data identify a position within the area of uncertainty which bounds points at which said subscriber unit could be located with the location error factored into the step of generating and said selecting step comprises the step of:

temporarily assigning said one subscriber unit to the one of said switching offices that is associated with the one of said geographical areas within which a center of said area 23. A method of operating a communication system having at least one satellite in an orbit around the earth, a data processor, a plurality of switching offices, and a population of subscriber units, said satellite, data processor, switching offices, and subscriber units being nodes of a communications network, and said method comprising the steps of:

permanently assigning said population of subscriber units to said data processors so that each subscriber unit is assigned to one of said data processors:

generating location data that identify a location for one of said subscriber units relative to the earth, wherein a location error is inherent in the step of generating the location data, and said location data identify a position within an area of uncertainty which bounds points at which said subscriber unit could be located with the location error factored into the step of generating:

storing area data at said data processor to which said one subscriber unit is assigned, said area data identifying geographical areas of the earth:

correlating, at said data processor to which said one subscriber unit is assigned, said location data with said area data: and selecting one of said plurality of switching offices for temporary assignment of said one subscriber unit, said one switching office being selected by said data processor to which said one subscriber unit is assigned in response to said correlating step, and said selecting step performed by determining whether said area of uncertainty overlies a boundary between two of said geographical areas, and generating additional location data when said area of uncertainty overlies said boundary, said additional location data being combined with said location data to shrink said area of uncertainty.

24. A method as claimed in claim 17 wherein:

said location data are generated at said one subscriber unit and transmitted to said satellite;

said satellite is configured to identify a cell area from which said location data are transmitted; and said method additionally comprises the step of correlating said cell area with said location data to verify said location data.

* * * * *

UNITED STATES PATENT AND TRADEMARK OFFICE
CERTIFICATE OF CORRECTION

PATENT NO. : 5,561,836
DATED : October 1, 1996
INVENTOR(S) : Kenneth L. Sowles et al.

It is certified that error appears in the above-indentified patent and that said Letters Patent is hereby corrected as shown below:

In column 19, claim 17, line 53, delete "base" and insert --based--.

In column 20, claim 22, line 42, after "said" change "boundary" to read --boundary--.

Signed and Sealed this

Fourteenth Day of October, 1997

Attest:

BRUCE LEHMAN

*Attesting Officer*   *Commissioner of Patents and Trademarks*